United States Patent
Curuvija et al.

(10) Patent No.: US 11,784,584 B2
(45) Date of Patent: Oct. 10, 2023

(54) VARIABLE MUTUAL OFF TIME CONTROL FOR AUTOMOTIVE POWER CONVERTER

(71) Applicant: FORD GLOBAL TECHNOLOGIES, LLC, Dearborn, MI (US)

(72) Inventors: Boris Curuvija, West Bloomfield, MI (US); Baoming Ge, Okemos, MI (US); Fan Xu, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 489 days.

(21) Appl. No.: 16/778,808

(22) Filed: Jan. 31, 2020

(65) Prior Publication Data

US 2021/0242798 A1 Aug. 5, 2021

(51) Int. Cl.
*B60L 50/10* (2019.01)
*H02M 7/527* (2006.01)

(52) U.S. Cl.
CPC ............. *H02M 7/527* (2013.01); *B60L 50/10* (2019.02); *B60L 2210/40* (2013.01)

(58) Field of Classification Search
USPC ........................................... 363/41; 307/10.1
See application file for complete search history.

(56) References Cited

U.S. PATENT DOCUMENTS

| | | | |
|---|---|---|---|
| 8,830,705 B2 | 9/2014 | Reichard et al. | |
| 9,584,045 B2 | 2/2017 | Rozand et al. | |
| 9,641,099 B2 | 5/2017 | Gupta et al. | |
| 2011/0188162 A1* | 8/2011 | Wetter | H02H 9/041 361/57 |
| 2018/0154786 A1* | 6/2018 | Wang | B60L 53/14 |
| 2019/0097562 A1* | 3/2019 | Lee | H02P 27/08 |
| 2020/0382042 A1* | 12/2020 | Nakayama | B62D 5/046 |

FOREIGN PATENT DOCUMENTS

JP 2021111986 * 8/2021

\* cited by examiner

*Primary Examiner* — Rexford N Barnie
*Assistant Examiner* — Xuan Ly
(74) *Attorney, Agent, or Firm* — David B. Kelley; Brooks Kushman, P.C.

(57) ABSTRACT

An automotive power converter may be controlled by detecting a magnitude of current output by a phase leg of the automotive power converter, selecting a mutual off time for switches of the phase leg according to the magnitude, and generating pulse width modulation signals for the switches having the mutual off time to operate the switches to transfer power between a traction battery and electric machine.

10 Claims, 3 Drawing Sheets

VARIABLE MUTUAL OFF TIME CONTROL FOR AUTOMOTIVE POWER CONVERTER

TECHNICAL FIELD

This disclosure relates to automotive power electronics components.

BACKGROUND

An electric or hybrid vehicle may contain one or more motors for propulsion. The vehicle may also contain a traction battery to provide energy for the motor. As the motor and traction battery may require differing electrical parameters for proper operation, electrical communication between them may require modification of the power provided or consumed.

SUMMARY

An automotive vehicle includes a traction battery, an electric machine, and an inverter that transfers power between the traction battery and electric machine. The inverter includes a pair of switches that defines a phase leg for the electric machine. The automotive vehicle also includes a controller that complementarily operates the switches with respective pulse width modulated signals. The signals each have a duty cycle and collectively define a mutual off time between pulses. The mutual off time varies according to a magnitude of current output by the phase leg such that as the magnitude increases, the mutual off time increases while the duty cycle remains constant and as the magnitude decreases, the mutual off time decreases while the duty cycle remains constant.

A method for controlling an automotive power converter includes detecting a magnitude of current output by a phase leg of the automotive power converter, selecting a mutual off time according to the magnitude, and generating pulse width modulation signals for switches of the phase leg having the mutual off time to transfer power between a traction battery and electric machine such that as the magnitude decreases the mutual off time decreases.

A power system for an automotive vehicle has a power inverter including a pair of switches defining a phase leg, a current sensor that measures a magnitude of current output by the phase leg, and a controller. The controller operates the switches with respective pulse width modulated signals that each have a duty cycle and collectively define a mutual off time between pulses. The controller also alters the mutual off time according to the magnitude such that the mutual off time decreases as the magnitude decreases while the duty cycle remains constant.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Some hybrid electric vehicle power converter systems employ mutual off time control algorithms to prevent dual on short circuit conditions. Such control algorithms can be implemented with software and pulse width modulated signals for gate drivers of each switching device. They also can be implemented with gate driver hardware.

Figure 1:
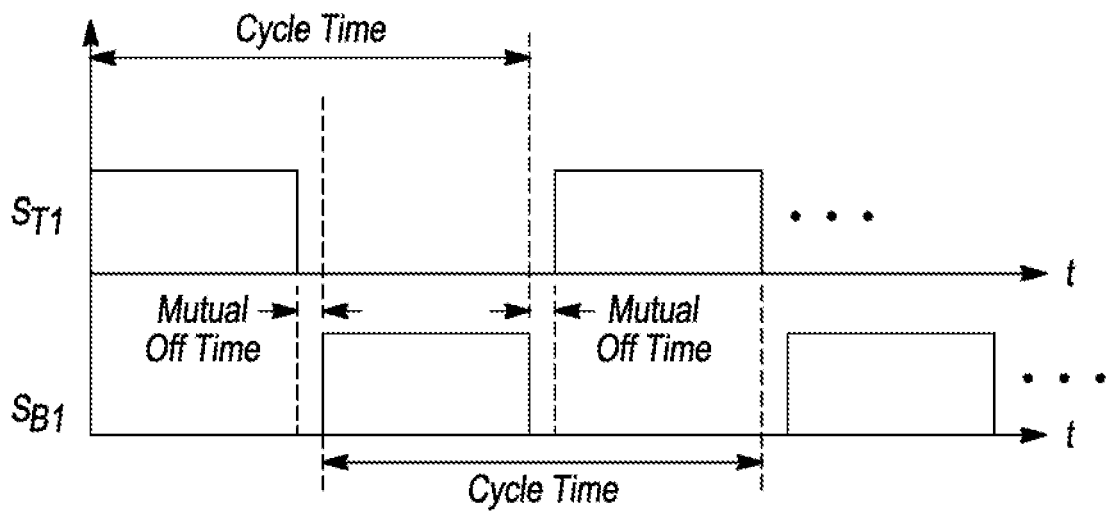
FIG. 1 is a schematic diagram of typical pulse width modulated signals that define mutual off times.

During every switching event, turn on and turn off mutual off times may be required to avoid dual on short circuit conditions. FIG. 1 shows the cycle time for complementary switches $S_{T1}$ and $S_{B1}$, and mutual off times between adjacent pulses of the switches during which both switches are off. Depending on the switching device characteristics, the mutual off time may need to be increased to ensure against dual on short circuit conditions. Since the mutual off time effectively modifies the control signal, there may be an unwanted harmonic distortion at the output of each phase leg of the converter. Presence of mutual off times can thus create nonlinear voltage output such as a voltage drop, and result in freewheeling currents through switch diodes, which can produce additional power loss. As apparent from FIG. 1, the duty cycle for each of the switches is defined as the amount of time during which the switch is on (the signal is high) relative to its cycle time. The cycle time and duty cycle can depend on power requirements, system design, etc. as known in the art.

In practical high power applications, the mutual off time may be set to a large value to ensure proper operation. As mentioned above however, longer mutual off times may cause distortion in output current waveforms, particularly when the system operates at low power and low current levels. The inventors have concluded that longer mutual off times are desired for high current levels and shorter mutual off times are desired for low current levels. A flexible control strategy that can achieve both may improve sinusoidal current waveform distortion and overall system performance.

Control strategies are proposed herein that can adjust the mutual off time under different converter operating conditions while maintaining the given duty cycle constant. Initially, switching waveforms for every turn on and turn off event may be obtained at different current levels in a test setting. Turn off tail current time duration can be measured and recorded for all operating voltage and current levels. The fall time can be measured and mapped into a look up table for all current levels. This data can then be used during real time control of a vehicle power system to adjust the mutual off time between gate driver cycles.

Figure 2:
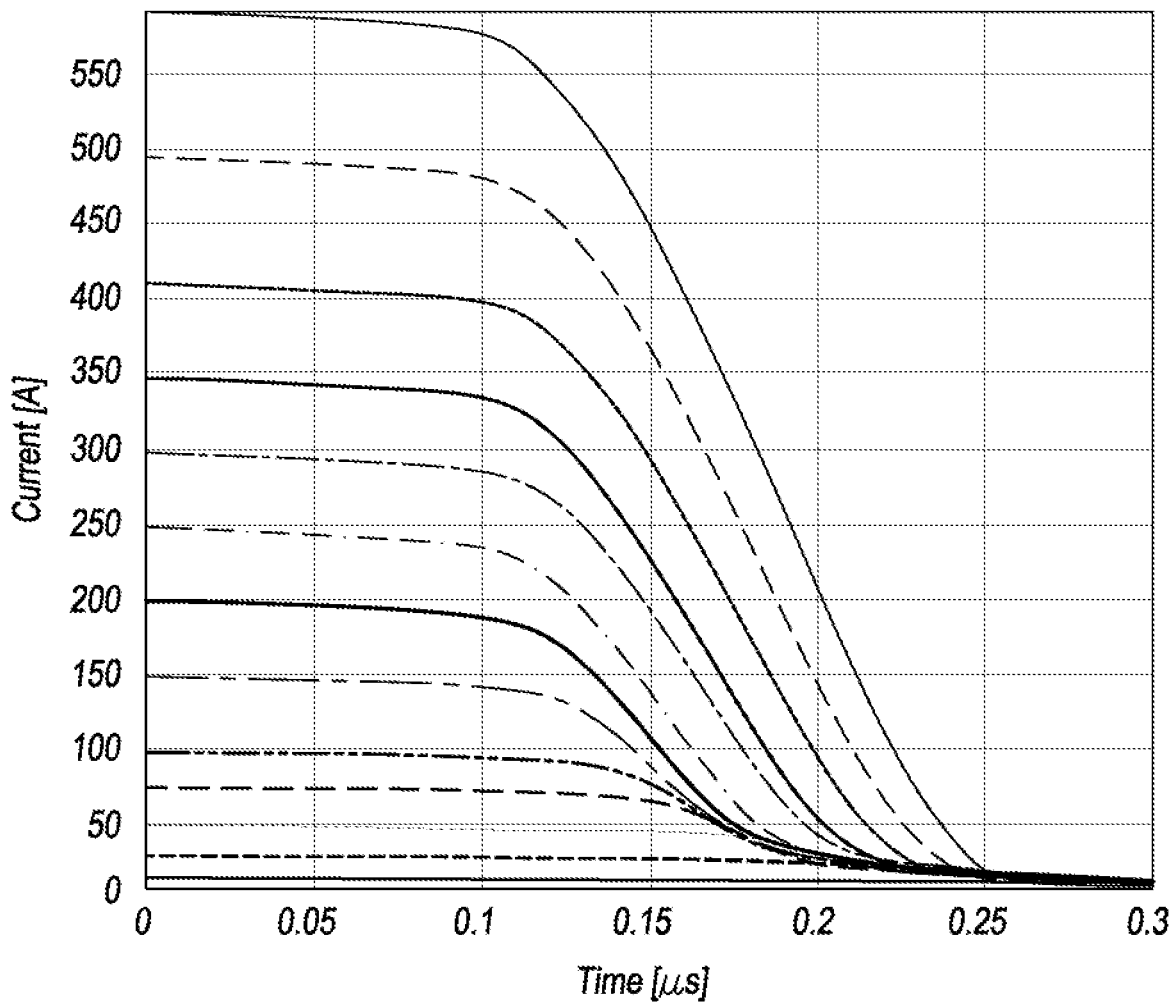
FIG. 2 is a plot of current magnitude versus time after a corresponding switching device has been commanded off.

FIG. 2 shows the duration of time for current through an example IGBT to reach zero after the IGBT is commanded off (at time zero). Although different switching devices may exhibit different waveform characteristics, the higher the current, the longer it takes for the current to fall to zero generally speaking. This data can be used to select the mutual off time based on converter output current. If converter output current is greater than 300 A, the mutual off time may be set at 0.3 microseconds. If converter output current is less than 300 A, the mutual off time may be set at 0.25 microseconds. Other scenarios are also contemplated. Every 50 A change in converter output current for example may be associated with a different mutual off time, etc.

Figure 3:
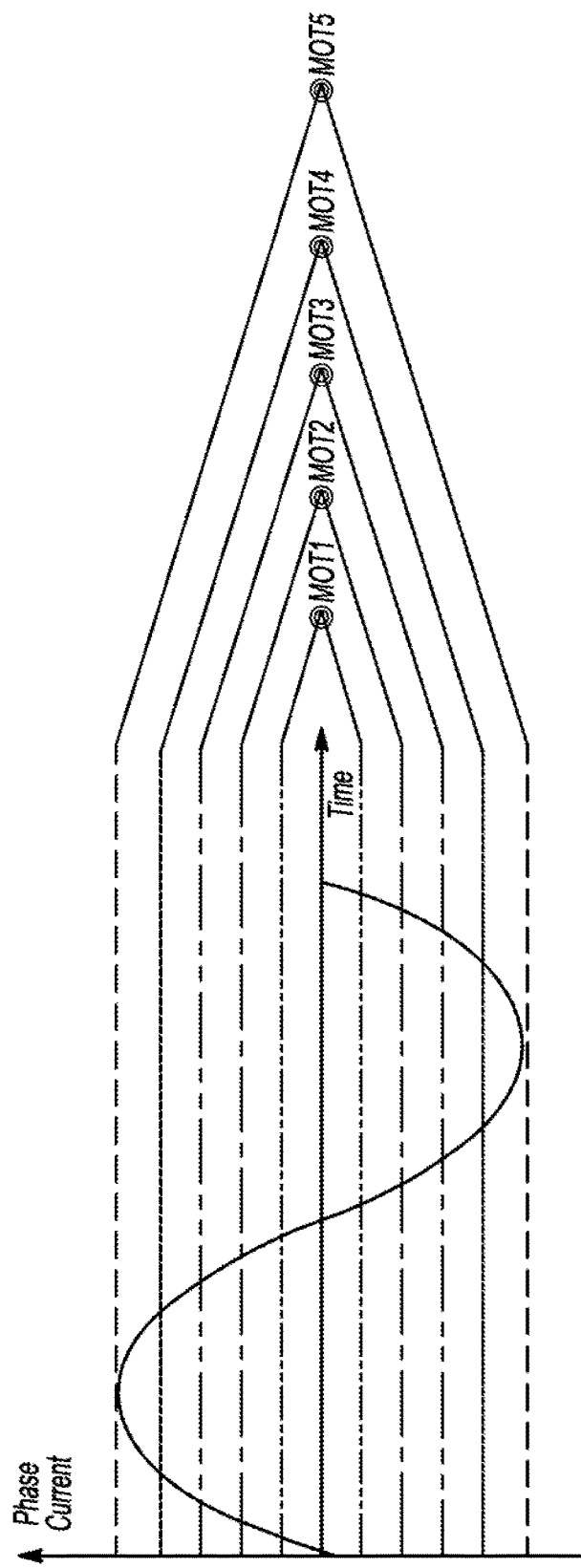
FIG. 3 is plot of phase current envelopes corresponding with various mutual off times.

Once current through a particular switching device of a phase leg has reached the zero axis, the complementary switching device can be turned on sooner or later according to an instantaneous magnitude of the converter output current to shorten or lengthen the mutual off time. This may result in optimized mutual off time control and reduction of harmonic distortion in the output. FIG. 3 shows that for a given phase current, a different mutual off time, e.g., MOT1, MOT2, MOT3, etc., can be selected. At low current levels, the output sinusoidal current waveform would typically have the highest harmonic distortion if the mutual off time were set high to account for high current levels. During low current output however, the mutual off time does not need to be large and it can be shortened. Likewise, during high current output, the mutual off time can be lengthened, etc. Particular mutual off times can be calculated from data similar to that shown in FIG. 2, and may vary by application. While FIG. 3 shows five different levels of mutual off times, a greater number (e.g., eight) of fewer number (e.g., two) of mutual off times can be used as desired. The mutual off time may also be adjusted continuously instead of in discrete fashion.

Figure 4:
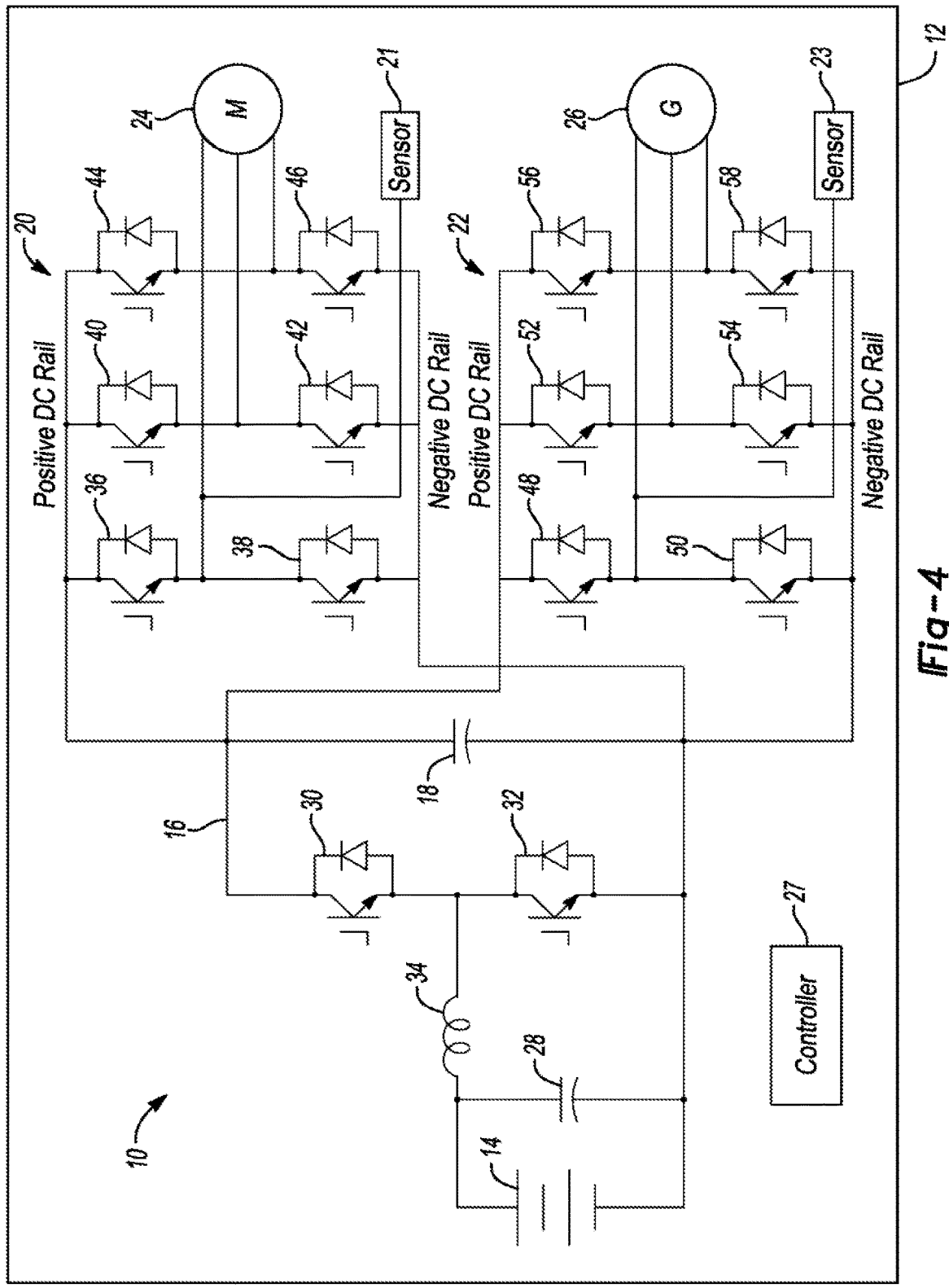
FIG. 4 is a schematic diagram of an automotive electric drive system.

With reference to FIG. 4, an example electric drive system 10 for a vehicle 12 includes a traction battery 14, a bridge-based DC-DC converter 16, a DC-link capacitor 18 for DC bus 19, two power converters (DC-AC inverters) 20, 22, a motor 24, a generator 26, and a controller 27. The bridge-based DC-DC converter 16 includes a capacitor 28 in parallel with the traction battery 14, a pair of series connected switches 30, 32 (e.g., transistors), and an inductor 34 between the capacitor and series connected switches 30, 32.

The DC-AC inverter 20 includes, in this example, three pairs of series connected switches 36, 38, 40, 42, 44, 46. Each of the pairs defines a corresponding phase leg for the motor 24 (electric machine). The generator 26 also includes three pairs of series connected switches 48, 50, 52, 54, 56, 58. Each of the pairs defines a corresponding phase leg for the generator 26 (electric machine). The switches 36, 38, 40, 42, 44, 46, 48, 50, 52, 54, 56, 58 can be insulated gate bipolar transistors (IGBTs), metal oxide semiconductor field effect transistors (MOSFETs), or other controllable semiconductor devices. In the following examples, the switches 36, 38, 40, 42, 44, 46, 48, 50, 52, 54, 56, 58 are shown to be IGBTs.

A voltage associated with power from the traction battery 14 may be increased by operation of the bridge-based DC-DC converter 16 for eventual delivery to the DC-AC inverter 20 and thus the motor 24 to propel the vehicle 12. Likewise, regenerative power captured by the generator 26 may be passed through the DC-AC inverter 22 and so on for storage in the traction battery 14. The controller 27 may implement such control through appropriate command of the switches 30, 32, 36, 38, 40, 42, 44, 46, 48, 50, 52, 54, 56, 58.

Dual on conditions can occur across the phase legs of the DC-AC inverters 20, 22. Gate signals of the switches 36, 38, for example, are usually complementary. In normal operating conditions, only one of the switches 36, 38 is turned on at any time. In the dual on condition, the switches 36, 38 are on at the same time, and the high DC voltage source is directly short circuited by the low impedance formed by the on-state resistances of the switches 36, 38. The dual on condition can generate a large current that is much higher than the normal operating current of the switches 36, 38.

Thus, the electric drive system 10 further includes sensors 21, 23 associated with the DC-AC inverters 20, 22 respectively. The sensor 21 is configured to measure a current output on the phase leg defined by the switches 36, 38. The sensor 23 is configured to measure a current output on the phase leg defined by the switches 48, 50. Other types of sensors may of course be used and arranged in any suitable fashion to detect currents associated with the DC-AC inverters 20, 22.

This data is used by the controller 27 to select the appropriate mutual off time for the pulse width modulated signals used to operate the switches 36, 38, 40, 42, 44, 46 and/or the switches 48, 50, 52, 54, 56, 58 as described above. The controller 27, for example, may select a mutual off time of 0.4 seconds responsive to a magnitude of the current measured being greater than some predefined threshold. The controller 28 may also select a mutual off time of 0.3 seconds responsive to the magnitude measured being less than some other predefined threshold. Once selected, the controller 27 may then generate the pulse width modulation commands with the selected mutual off time using known techniques based on the desired cycle time, desired duty cycle, and selected mutual off time.

Figure 5:
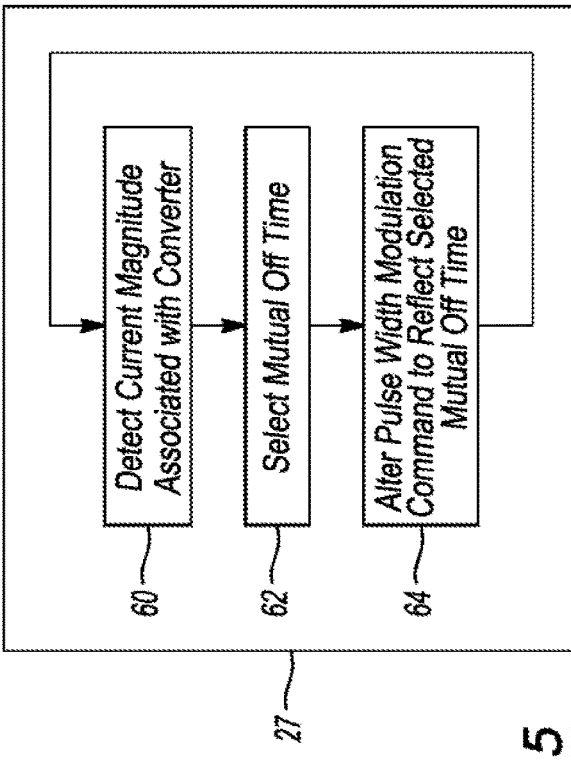
FIG. 5 is a flow chart of an algorithm for variable mutual off time control.

FIG. 5 shows the controller 27 executing an algorithm to implement some of the variable mutual off time techniques contemplated herein. At operation 60, the controller 27 may detect current magnitude associated with operation of the power converter 20. As mentioned above, this data may be obtained from a sensor, such as the sensor 21, arranged to measure a current output by a phase leg of the power converter 20. At operation 62, the controller 27 may select a mutual off time according to the magnitude of the output current. The controller 27, for example, may access a look-up table containing data similar to that illustrated in FIG. 3. At operation 64, the controller may alter the pulse width modulation commands used to complementarily control the pair of switches 36, 38, the pair of switches 40, 42, and the pair of switches 44, 46.

As compared with certain conventional control techniques, the proposed strategies can reduce harmonic distortion, improve the sinusoidal current waveform, and reduce electric machine power loss. Moreover, the proposed strategies need not require additional hardware to implement.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An automotive vehicle comprising:
    a traction battery;
    an electric machine;
    an inverter configured to transfer power between the traction battery and electric machine, and including a pair of switches defining a phase leg for the electric machine; and
    a controller configured to
        detect a magnitude of current output by the phase leg,
        select a mutual off time according to the magnitude, including responsive to the magnitude exceeding a first predetermined threshold, setting the mutual off time to a first value, and responsive to the magnitude being less than a second predetermined threshold, setting the mutual off time to a second value less than the first value, and
        generate pulse width modulation signals for the switches having the mutual off time to transfer power between the traction battery and electric machine such that as the magnitude decreases the mutual off time decreases.

2. The automotive vehicle of claim 1, wherein the electric machine is a motor.

3. The automotive vehicle of claim 1, wherein the electric machine is a generator.

4. A method for controlling an automotive power converter, the method comprising:
    detecting a magnitude of current output by a phase leg of the automotive power converter, wherein the phase leg is defined by a pair of switches;
    selecting a mutual off time according to the magnitude, including responsive to the magnitude exceeding a first predetermined threshold, setting the mutual off time to a first value, and responsive to the magnitude being less than a second predetermined threshold, setting the mutual off time to a second value less than the first value; and
    generating pulse width modulation signals for the switches having the mutual off time to transfer power between a traction battery and electric machine such that as the magnitude decreases the mutual off time decreases.

5. The method of claim 4, wherein the first and second predetermined thresholds are same.

6. The method of claim 4, wherein the first and second values are less than 0.5 microseconds.

7. A power system for an automotive vehicle comprising:
    a power inverter including a pair of switches defining a phase leg;
    a current sensor configured to measure a magnitude of current output by the phase leg; and
    a controller configured to
        select a mutual off time according to the magnitude, including responsive to the magnitude exceeding a first predetermined threshold, setting the mutual off time to a first value, and responsive to the magnitude being less than a second predetermined threshold, setting the mutual off time to a second value less than the first value, and
        generate pulse width modulation signals for the switches having the mutual off time to transfer power between a traction battery and electric machine such that as the magnitude decreases the mutual off time decreases.

8. The power system of claim 7, wherein the controller is further configured to alter the mutual off time according to the magnitude such that the mutual off time increases as the magnitude increases.

9. The power system of claim 7, wherein the electric machine is a motor.

10. The power system of claim 7, wherein the electric machine is a generator.

* * * * *